US012804785B2

(12) United States Patent
Huang et al.

(10) Patent No.: US 12,804,785 B2
(45) Date of Patent: Nov. 17, 2026

(54) TEMPERATURE CONTROL SWITCH CIRCUIT AND LAMP POWER CONVERTER

(71) Applicant: Changzhou Jutai Electronic Co., Ltd., Changzhou (CN)

(72) Inventors: Wei Huang, Changzhou (CN); Chengqian Pan, Changzhou (CN)

(73) Assignee: Changzhou Jutal Electronic Co., Ltd., Changzhou (CN)

( * ) Notice: Subject to any disclaimer, the term of this patent is extended or adjusted under 35 U.S.C. 154(b) by 326 days.

(21) Appl. No.: 18/663,860

(22) Filed: May 14, 2024

(65) Prior Publication Data

US 2025/0284302 A1 Sep. 11, 2025

(30) Foreign Application Priority Data

Mar. 7, 2024 (CN) ......................... 202420436231.6

(51) Int. Cl.

| | |
|---|---|
| ***H05B 45/56*** | (2020.01) |
| ***H02H 5/04*** | (2006.01) |
| ***H02M 1/32*** | (2007.01) |
| ***H05B 45/37*** | (2020.01) |
| ***H05B 45/382*** | (2020.01) |
| *H01C 7/04* | (2006.01) |
| *H01H 37/00* | (2006.01) |

(52) U.S. Cl.

CPC ............ *H05B 45/56* (2020.01); *H02H 5/042* (2013.01); *H02M 1/327* (2021.05); *H05B 45/37* (2020.01); *H05B 45/382* (2020.01); *H01C 7/04* (2013.01); *H01H 37/002* (2013.01)

(58) Field of Classification Search

CPC ....... H05B 31/00–47/29; H05B 45/382; H05B 45/46; H02H 5/04; H02H 5/042; H02M 1/327

See application file for complete search history.

(56) References Cited

U.S. PATENT DOCUMENTS

| | | | | |
|---|---|---|---|---|
| 3,631,322 A * | 12/1971 | Kruger | H05B 41/46 | 361/103 |
| 4,099,508 A * | 7/1978 | Noguchi | F02P 3/04 | 123/624 |
| 2011/0163696 A1* | 7/2011 | Huang | H05B 45/18 | 315/309 |
| 2014/0247522 A1* | 9/2014 | Simi | H05B 45/50 | 361/18 |
| 2017/0347414 A1* | 11/2017 | Harada | H05B 45/3725 | |

* cited by examiner

*Primary Examiner* — Thienvu V Tran
*Assistant Examiner* — Christopher J Clark

(57) ABSTRACT

The application discloses a temperature control switch circuit includes a switch circuit body, and also includes a first temperature control unit or a second temperature control unit for preventing the switch circuit body from being damaged by temperature, and the first temperature control unit or the second temperature control unit is electrically connected with the switch circuit body. The present disclosure has the following advantages. The first temperature control unit or the second temperature control unit is additionally arranged in the switch circuit body. The temperature is sensed or detected by the first temperature control unit or the second temperature control unit. When the temperature exceeds the set temperature, commercial power is unavailable, and a load connected with the switch circuit cannot operate, so that each unit in the switch circuit is protected.

14 Claims, 7 Drawing Sheets

TEMPERATURE CONTROL SWITCH CIRCUIT AND LAMP POWER CONVERTER

CROSS-REFERENCE TO RELATED APPLICATION

This application claims priority from the Chinese patent application 2024204362316 filed Mar. 7, 2024, the content of which is incorporated herein in the entirety by reference.

TECHNICAL FIELD

The present disclosure relates to a temperature control switch circuit used for supplying power for lamps.

BACKGROUND

The LED (Light Emitting Diode) light string can achieve various luminous effects, so the LED light string is usually used at festivals. The voltage of direct current used by the LED light string is generally 5V, but the commercial power is usually 220V alternating current. Therefore, it is usually necessary to use a special power converter to convert 220V alternating current into 5V direct current for the LED light string.

At present, the special power converter is generally composed of a switching circuit, a control circuit and a drive circuit. The alternating current is converted into direct current by the switching circuit, and is supplied to the control circuit and the drive circuit. A chip (generally a single chip microcomputer) in the control circuit has built-in control signals with various duty ratios, and the user selects one of the control signals, so that the drive circuit can output PWM (Pulse-Width Modulation) signals under the control of the control circuit, and the LED light string generates corresponding flashing effects according to the duty ratios of the PWM signals.

The switching circuit, the control circuit and the drive circuit are usually assembled on the PCB (Printed Circuit Board) 1, and then the PCB 1 is installed in the insulating shell 2 with conductive pins (as shown in FIG. 1A to FIG. 2). And then, the end cover 3 and the insulating shell 2 are hermetically fixed to prevent water from entering the insulating shell 2.

From the above, after the insulating shell 2 is combined with the end cover 3, a closed cavity is formed between the insulating shell 2 and the end cover 3, but the PCB and corresponding electronic components in each circuit are located in the narrow closed cavity. Because the electronic components are heated when the circuits work, and heat emitted by the electronic components can only be conducted to the insulating shell 2 by thermal radiation. The insulating shell 2 is generally made of PVC (polyvinyl chloride) materials, and is limited in heat dissipation effect. Moreover, the heat emitted by the electronic components is conducted to the insulating shell 2 by means of thermal radiation, so that the heat transfer efficiency in such manner is also low. Therefore, the temperature in the closed space is actually high. If the special power supply works for a long time, the electronic components located in the closed space may be damaged due to poor heat dissipation, and a fire may occur in serious cases. That is, the structure has a safety hazard of poor heat dissipation.

SUMMARY

Aiming at the above technical problem, the present disclosure provides a temperature control switch circuit.

The technical scheme for solving the technical problem is as follows.

A temperature control switch circuit includes a switch circuit body, and also includes a first temperature control unit or a second temperature control unit for preventing the switch circuit body from being damaged by temperature, and the first temperature control unit or the second temperature control unit is electrically connected with the switch circuit body.

The present disclosure has the following advantages. The first temperature control unit or the second temperature control unit is additionally arranged in the switch circuit body. The temperature is sensed or detected by the first temperature control unit or the second temperature control unit. When the temperature exceeds the set temperature, commercial power is unavailable, and a load connected with the switch circuit cannot operate, so that each unit in the switch circuit is protected.

DETAILED DESCRIPTION OF THE EMBODIMENTS

Embodiment I

Figure 1A:
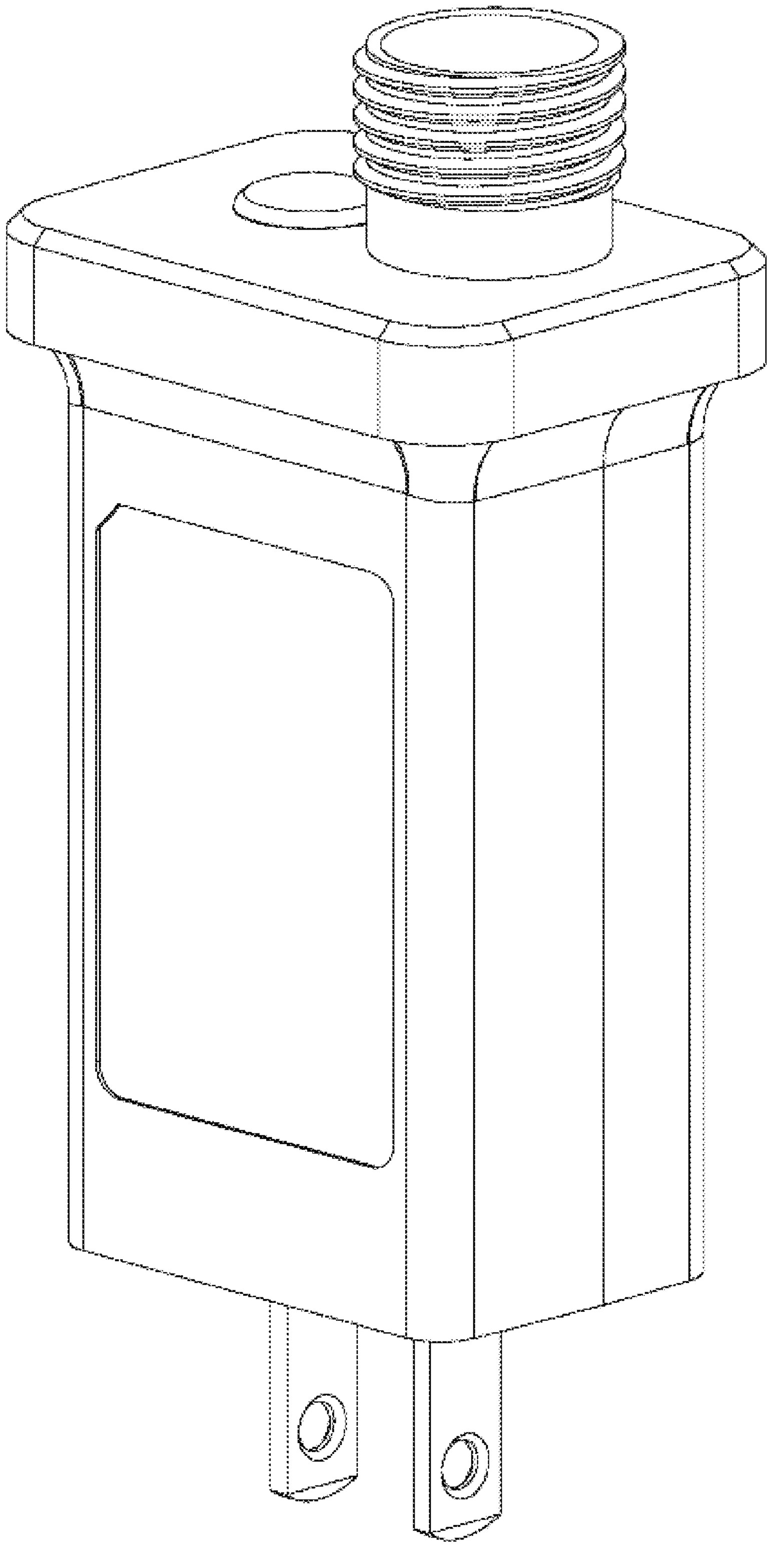
FIG. 1A is a space diagram of the appearance of a first power converter.
Figure 1B:
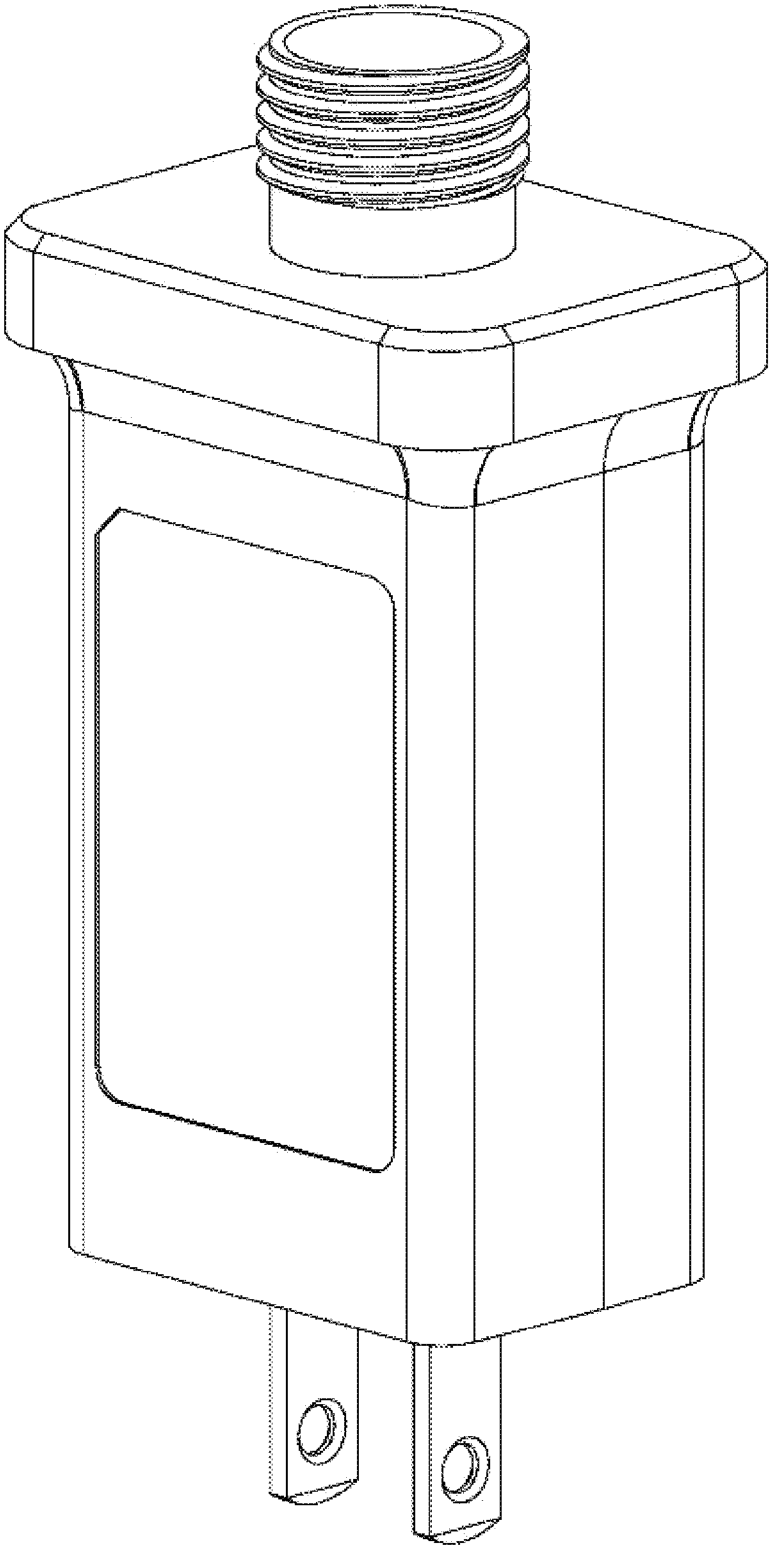
FIG. 1B is a space diagram of the appearance of a second power converter.
Figure 2:
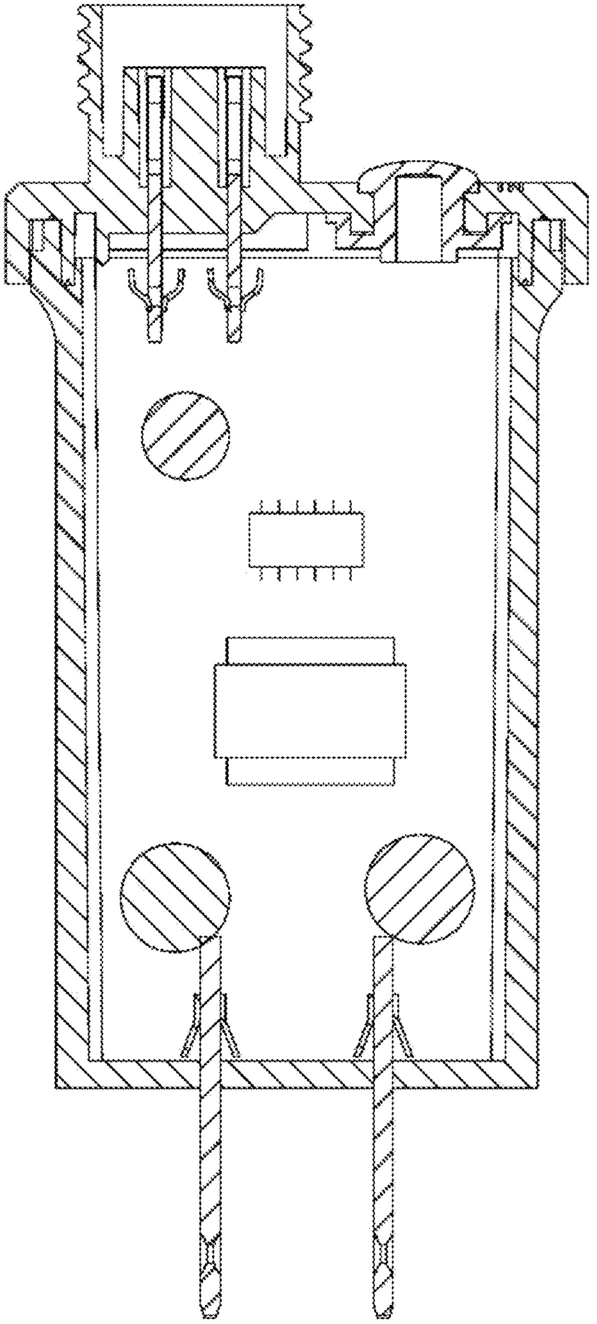
FIG. 2 is a cross-section diagram of a mechanical structure of a power converter in FIG. 1A.
Figure 3:
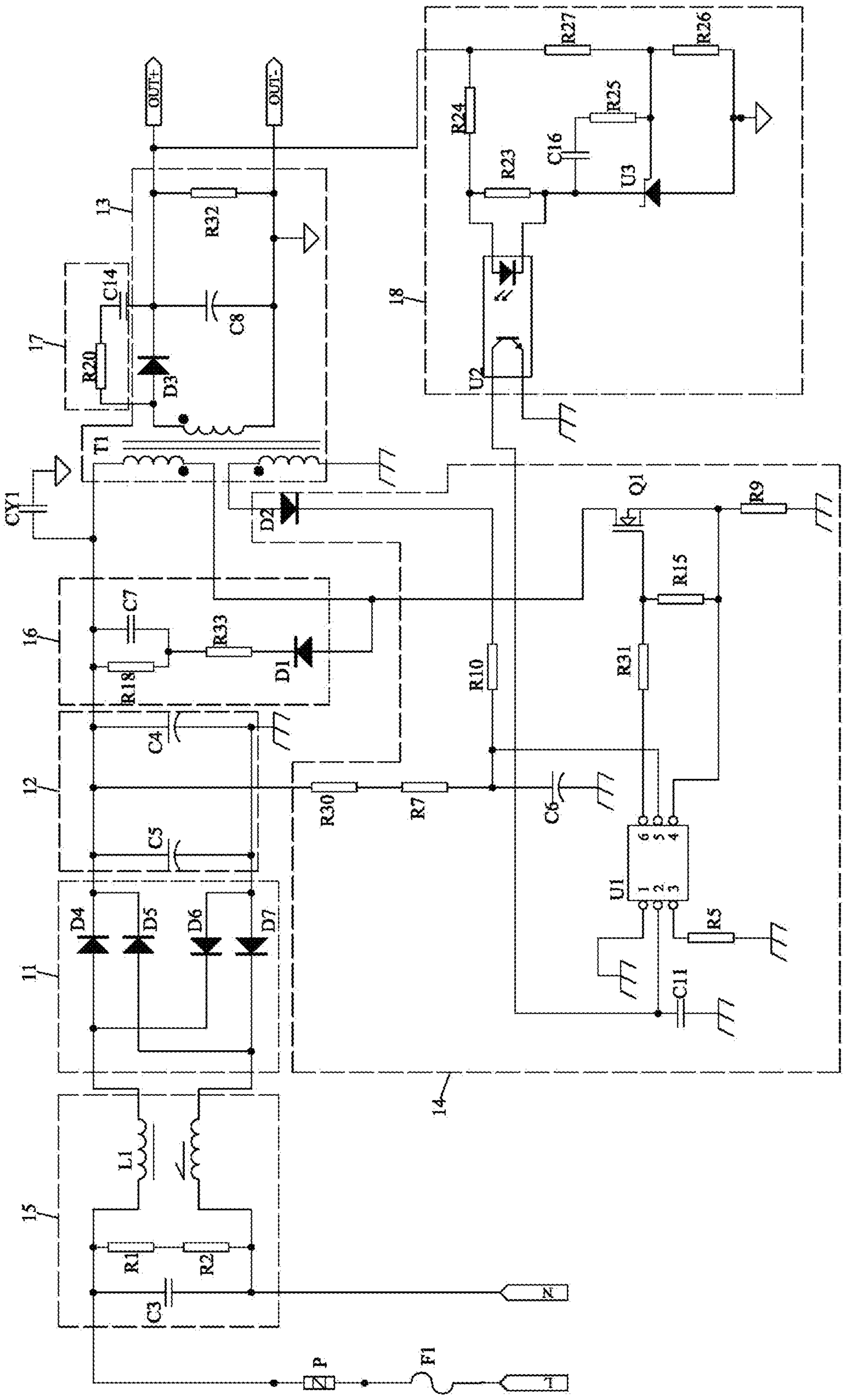
FIG. 3 is a schematic circuit diagram of a temperature control switch circuit in the first embodiment.

As shown in FIG. 1A to FIG. 3, a temperature control switch circuit includes a switch circuit body, and a first temperature control unit P or a second temperature control unit NTC for preventing the switch circuit body from being damaged by temperature. The switch circuit body include a rectifier unit 11, a first filter unit 12, a voltage conversion unit 13, a voltage conversion control unit 14, a first temperature control unit P and an anti-electromagnetism interference unit 15. The relations among the parts are described as follows.

The rectifier unit 11 is used for converting direct current into direct current, and the rectifier unit 11 is a rectifier bridge consisting of four diodes. The first filter unit 12 is electrically connected with the rectifier unit 11. The first filter unit 12 includes a fourth capacitor C4 and a fifth capacitor C5. One end of the fourth capacitor C4 and one end of the fifth capacitor C5 are respectively connected with the output end of the rectifier unit 11. The other end of the fourth capacitor C4 and the other end of the fifth capacitor C5 are grounded.

The voltage conversion unit 13 is electrically connected with the first filter unit 12. The voltage conversion unit 13 includes a transformer T1, a third diode D3, an eighth capacitor C8 and a thirty-second resistor R32. The input side of the transformer T1 is connected with one end of the fourth capacitor C4 in parallel. An anode end of the third diode D3 is connected with one end of the output side of the transformer T1, and a cathode end of the third diode D3 is respectively connected with one end of the eighth capacitor C8 and the thirty-second resistor R32. The output side of the transformer T1, the eighth capacitor C8 and the other end of the thirty-second resistor R32 are respectively grounded.

The voltage conversion control unit 14 is electrically connected with the voltage conversion unit 13. The voltage conversion control unit 14 includes a power control chip U1 and a switch tube Q1. The power control chip U1 is respectively electrically connected with the thermistor with a negative temperature coefficient and the switch tube Q1. The switch tube Q1 is electrically connected with the voltage conversion unit 13. The switch tube Q1 is an audion or an MOS (Metal Oxide Semiconductor) tube. In the embodiment, the switch tube Q is preferably an MOS tube, and a drain electrode of the switch tube Q1 is electrically connected with the voltage conversion unit 13.

The voltage conversion control unit 14 also includes a thirtieth resistor R30, a seventh resistor R7, a sixth capacitor C6, a tenth resistor R10, a second diode D2, a thirty-first resistor R31, a ninth resistor R9 and a fifteenth resistor R15. One end of the thirtieth resistor R30 is connected with the output end of the rectifier unit 11, and the other end of the thirtieth resistor R30 is connected with the seventh resistor R7. The other end of the seventh resistor R7 is respectively connected with one end of the sixth capacitor C6, one end of the tenth resistor R10 and the power control chip U1. The other end of the sixth capacitor C6 is grounded. The other end of the tenth resistor R10 is connected with a cathode end of the second diode D2. An anode end of the second diode D2 is connected with the input side of the transformer T1. The thirty-first resistor R31 is connected between the power control chip U1 and a grid electrode of the switch tube Q1. The thirty-first resistor R31 is a drive resistor of the switch tube Q1. The power control chip U1 and one end of the ninth resistor R9 are connected with a source electrode of the switch tube Q1, and the other end of the ninth resistor R9 is grounded. One end of the fifteenth resistor R15 is connected with the grid electrode of the switch tube Q1, and the other end of the fifteenth resistor R15 is connected with the source electrode of the switch tube Q1. The fifteenth resistor R15 is a gate bleeder resistor of the switch tube Q1.

When the first temperature control unit P is used, the first temperature control unit P is arranged on the upper stream or down stream of the rectifier unit 11. In the embodiment, the first temperature control unit P is preferably arranged on the upper stream of the rectifier unit 11, so that temperature protection is possibly carried out on all subsequent units. One end of the first temperature control unit P is used for connecting a positive electrode of commercial power. The first temperature control unit P is a bimetal temperature switch, or a PTC (Positive Temperature Coefficient) element, or a temperature fuse. In the embodiment, the first temperature control unit P is preferably a bimetal temperature switch. The bimetal temperature switch can be attached to any one of the rectifier unit 11 and the voltage conversion unit 13 so as to sense the temperature of these units. A PCB (Printed circuit board) is located in a sealed cavity formed by an insulating shell 2 and an end cover 3, so the bimetal temperature switch can also be suspended in air to detect the air temperature inside the sealed cavity. When the temperature exceeds a threshold value of the bimetal temperature switch, the bimetal temperature switch is disconnected, so that the temperature control switch circuit is integrally in a disconnected state, and the temperature control switch circuit cannot operate. When the temperature descends to the threshold value of the bimetal temperature switch, the bimetal temperature switch is closed, and the temperature control circuit is in an operating state.

The anti-electromagnetism interference unit 15 is located between the rectifier unit 11 and the first temperature control unit P. The anti-electromagnetism interference unit 15 includes a third capacitor C3, a first resistor R1, a second resistor R2 and a first inductor L1. The third capacitor 3 and one end of R1 are connected with the other end of the bimetal temperature switch (first temperature control unit P). The other end of the first resistor R1 is connected with one end of the second resistor R2. The third capacitor C3 and the other end of the second resistor R2 are connected with one end of a fuse F1. The other end of the fuse F1 is used for connecting a negative electrode of commercial power. The first inductor L1 is connected with one end of the first resistor R1 and the other end of the second resistor R2. The first inductor L1 is also connected with the rectifier unit 11.

In the embodiment, the temperature control switch circuit also includes a first peak voltage absorption unit 16 and a second peak voltage absorption unit 17. The first peak voltage absorption unit 16 is connected with the input side of the voltage conversion unit 13. The second peak voltage absorption unit 17 is connected with the output side of the voltage conversion unit 13.

The first peak voltage absorption unit 16 includes an eighteenth resistor R18, the seventh capacitor C7, the thirty-third resistor R33 and a first diode D1. The eighteenth resistor R18 and one end of the seventh capacitor C7 are respectively connected with one end of the fourth capacitor C4. The eighteenth resistor R18 and the other end of the seventh capacitor C7 are respectively connected with one end of the thirty-third resistor R32. The other end of the thirty-third resistor R33 is connected with a cathode end of the first diode D1. An anode end of the first diode D1 is connected with the input side of the transformer T1.

The second peak voltage absorption unit 17 includes a twentieth resistor R20 and a fourteenth capacitor C14. One end of the twentieth resistor R20 is connected with the anode end of the third diode D3, and the other end of the twentieth resistor R20 is connected with one end of the fourteenth capacitor C14. The other end of the fourteenth capacitor C14 is connected with the cathode end of the third diode D3.

In the embodiment, the temperature control switch circuit also includes a voltage detection circuit 18. An input end of the voltage detection circuit 18 is connected with an output side of the voltage conversion unit 13, and an output end of the voltage detection circuit 18 is connected with the voltage conversion control unit 14. The voltage detection circuit 18 includes a twenty-third resistor R23, a twenty-fourth resistor R24, a twenty-fifth resistor R25, a twenty-sixth resistor R26, a twenty-seventh resistor R27, a sixteenth capacitor C16, a voltage reference circuit U3 and a photoelectric coupler U2.

One end of the twenty-fourth resistor R24 and one end of the twenty-seventh resistor R27 are respectively connected with the output side of the voltage conversion unit 13. One end of the twenty-fifth resistor R25 and one end of the twenty-sixth resistor R26 are respectively connected with the other end of the twenty-seventh resistor R27. The twenty-sixth resistor R26 and the twenty-seventh resistor R27 are used for voltage sampling. The other end of the twenty-sixth resistor R26 and one end of the voltage reference circuit U3 are grounded. The other end of the twenty-fifth resistor R25 is connected with one end of the sixteenth capacitor C16. The other end of the voltage reference circuit U3 and one end of the twenty-third resistor R23 are respectively connected with the other end of the sixteenth capacitor C16. A feedback end of the voltage reference circuit U3 is connected with one end of the twenty-fifth resistor R25. The sixteenth capacitor C16 and the twenty-fifth resistor R25 play a role in compensation to prevent the voltage detection circuit 18 from operating unstably.

The twenty-third resistor R23 provides operating current for the voltage reference circuit U3. The other end of the twenty-third resistor R23 is connected with the other end of the twenty-fourth resistor R24. The twenty-fourth resistor R24 is a current-limiting resistor. The input side of the photoelectric coupler U2 is connected with the twenty-third resistor R23, and the output side of the photoelectric coupler U2 is connected with the voltage conversion control unit 14.

Embodiment II

Figure 4:
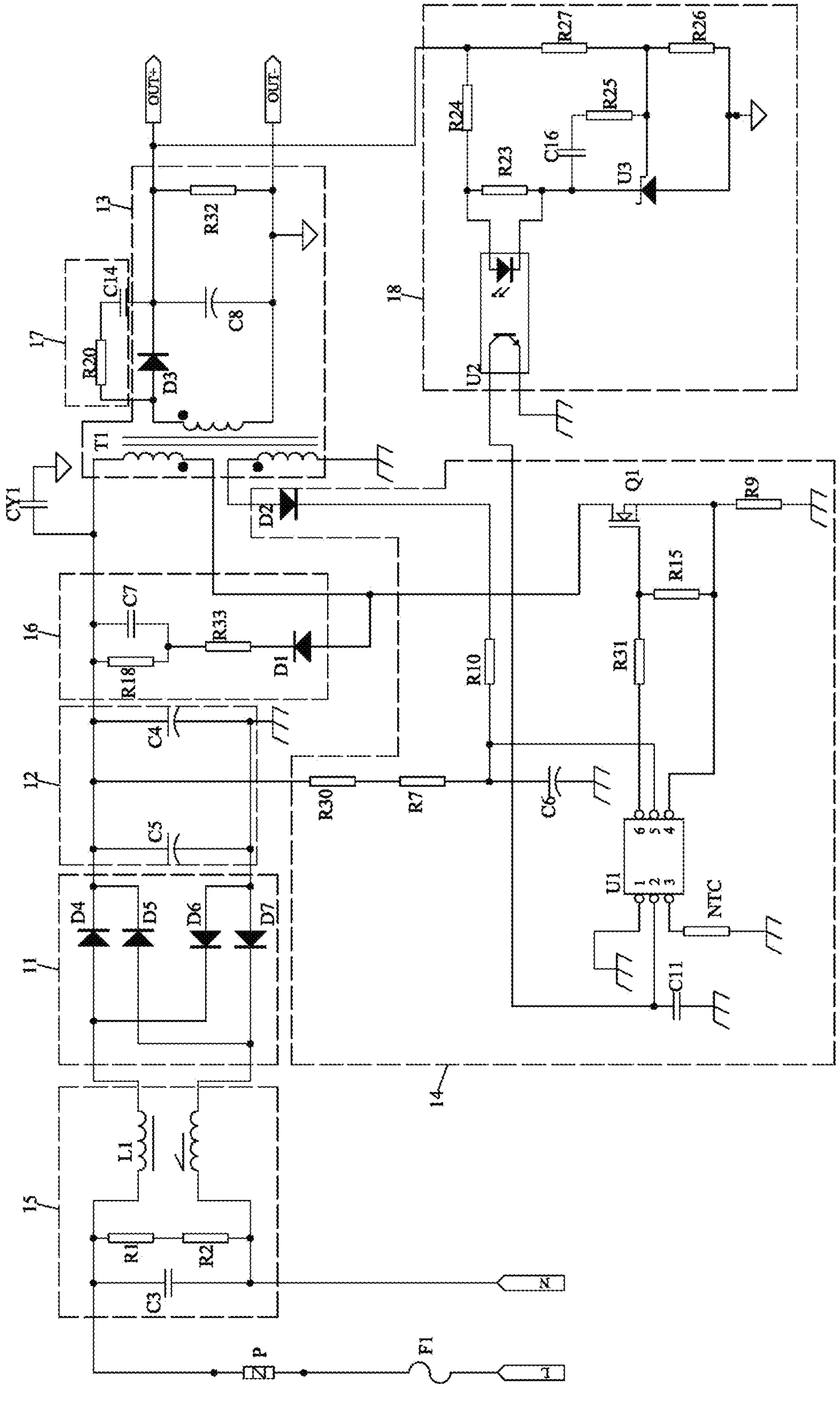
FIG. 4 is a schematic circuit diagram of a temperature control switch circuit in the second embodiment.

The difference between the embodiment and the first embodiment lies in that as shown in FIG. 4, the first temperature control unit P is replaced by the second temperature control unit NTC, and the second temperature control unit NTC is connected with the voltage conversion control unit 14. A temperature control module is formed by the second temperature control unit NTC and the power control chip U1 in the voltage conversion control unit 14. The second temperature control unit NTC is preferably a thermistor with a negative temperature coefficient. The second temperature control unit NTC is attached to any one of the rectifier unit 11 and the voltage conversion unit 13 like the bimetal temperature switch. The second temperature control unit NTC can also be suspended in air.

When the temperature detected by the second temperature control unit NTC rises, the resistance value is decreased. A constant current source inside the power control chip U1 outputs current outwards. The current flows through the second temperature control unit NTC, so that the resistance value is decreased. The current is constant, so that the voltage on the second temperature control unit NTC is decreased, namely the voltage on a pin 3 of the power control chip U1 is decreased. When the voltage is lower than 1 V, an over-temperature failure is judged inside the power control chip U1. The power control chip U1 cuts off the output instantly, and a power supply is disconnected.

Embodiment III

Figure 5:
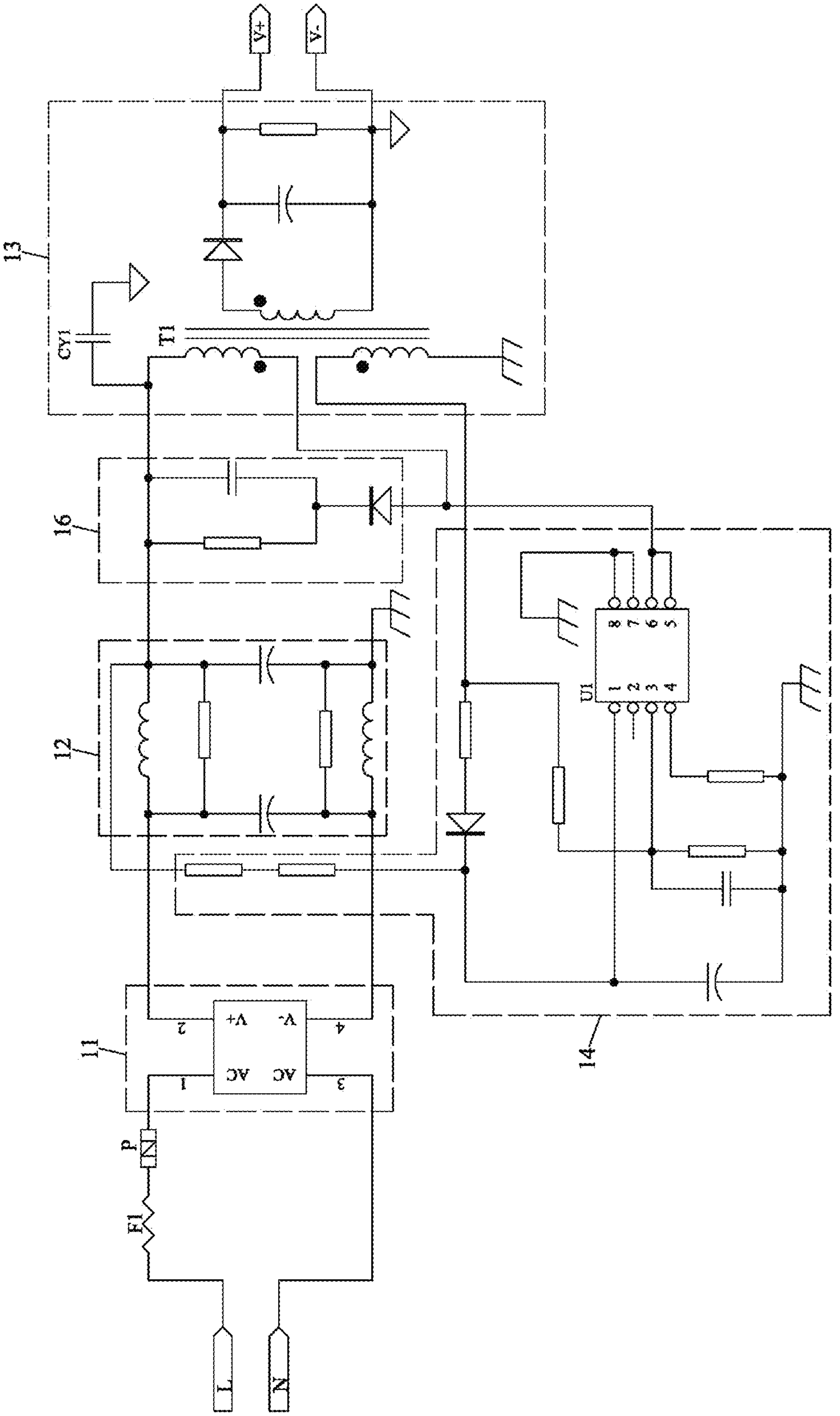
FIG. 5 is a schematic circuit diagram of a temperature control switch circuit in the third embodiment.

As shown in FIG. 5, the difference between the embodiment and the first embodiment lies in that the first filter unit 12, the voltage conversion unit 13 and the voltage conversion control unit 14 are different structurally, but are the same in working principles. Wherein, the switch tube is integrated in the power control unit U1.

Figure 6:
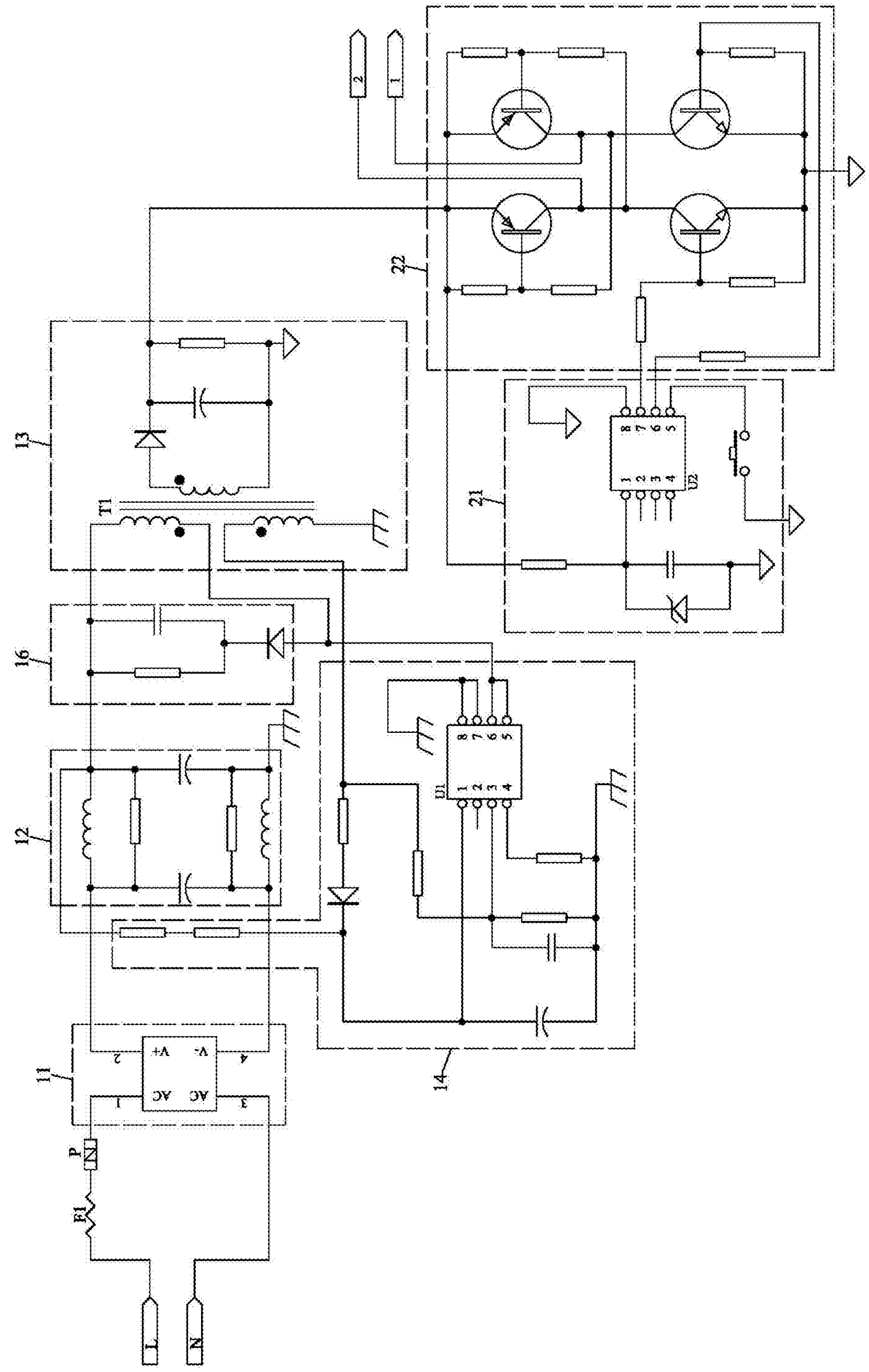
FIG. 6 is a schematic circuit diagram of a power converter.

As shown in FIG. 6, a lamp power converter includes a control circuit 21 and a drive circuit 22, and also includes the temperature control switch circuit in any one of the above embodiments. The temperature control switch circuit is electrically connected with the control circuit 21, and the control circuit 21 is electrically connected with the drive circuit 22.

What is claimed is:

1. A temperature control switch circuit, comprising a switch circuit body, wherein the temperature control switch circuit also comprises a first temperature control unit (P) or a second temperature control unit (NTC) for preventing the switch circuit body from being damaged by temperature, and the first temperature control unit (P) or the second temperature control unit (NTC) is electrically connected with the switch circuit body;

wherein the switch circuit body comprises:

a rectifier unit (11) for converting alternating current into direct current;

a first filter unit (12), the first filter unit (12) being electrically connected with the rectifier unit (11);

a voltage conversion unit (13), the voltage conversion unit (13) being electrically connected with the first filter unit (12);

a voltage conversion control unit (14), the voltage conversion control unit (14) being electrically connected to the voltage conversion unit (13); wherein the first temperature control unit (P) is arranged on the upper stream or down stream of the rectifier unit (11), or the second temperature control unit (NTC) is connected with the voltage conversion control unit (14);

the temperature control switch circuit also comprises a voltage detection circuit (18), an input end of the voltage detection circuit (18) is connected with an output side of the voltage conversion unit (13), and an output end of the voltage detection circuit (18) is connected with the voltage conversion control unit (14);

the voltage detection circuit (18) comprises a twenty-third resistor (R23), a twenty-fourth resistor (R24), a twenty-fifth resistor (R25), a twenty-sixth resistor (R26), a twenty-seventh resistor (R27), a sixteenth capacitor (C16), a voltage reference circuit (U3) and a photoelectric coupler (U2); and one end of the twenty-fourth resistor (R24) and one end of the twenty-seventh resistor (R27) are respectively connected with the output side of the voltage conversion unit (13), one end of the twenty-fifth resistor (R25) and one end of the twenty-sixth resistor (R26) are respectively connected with the other end of the twenty-seventh resistor (R27), the other end of the twenty-sixth resistor (R26) and one end of the voltage reference circuit (U3) are grounded, the other end of the twenty-fifth resistor (R25) is connected with one end of the sixteenth capacitor (C16), the other end of the voltage reference circuit (U3) and one end of the twenty-third resistor (R23) are respectively connected with the other end of the sixteenth capacitor (C16), a feedback end of the voltage reference circuit (U3) is connected with one end of the twenty-fifth resistor (R25), the other end of the twenty-third resistor (R23) is connected with the other end of the twenty-fourth resistor (R24), the input side of the photoelectric coupler (U2) is connected with the twenty-third resistor (R23), and the output side of the photoelectric coupler (U2) is connected with the voltage conversion control unit (14).

2. The temperature control switch circuit according to claim 1, wherein the first temperature control unit (P) is a bimetal temperature switch, or a PTC (Positive Temperature Coefficient) element, or a temperature fuse, or other temperature protection devices.

3. The temperature control switch circuit according to claim 1, wherein the second temperature control unit (NTC) is a thermistor with a negative temperature coefficient, and the voltage conversion control unit (14) comprises a power control chip (U1) and a switch tube (Q1), the power control chip (U1) is electrically connected with the thermistor with a negative temperature coefficient, and the switch tube (Q1) is electrically connected with the voltage conversion unit (13).

4. The temperature control switch circuit according to claim 1, wherein the temperature control switch circuit also comprises an anti-electromagnetism interference unit (15), the anti-electromagnetism interference unit (15) is located between the rectifier unit (11) and the first temperature control unit (P).

5. The temperature control switch circuit according to claim 1, wherein the temperature control switch circuit also comprises a first peak voltage absorption unit (16) and a second peak voltage absorption unit (17), the first peak voltage absorption unit (16) is connected with the input side of the voltage conversion unit (13), and the second peak voltage absorption unit (17) is connected with the output side of the voltage conversion unit (13).

6. A lamp power converter, comprising a control circuit and a drive circuit, wherein the lamp power converter also comprises the temperature control switch circuit according to claim 1 the temperature control switch circuit is electrically connected with the control circuit, and the control circuit is electrically connected with the drive circuit.

7. The temperature control switch circuit according to claim 2, wherein the temperature control switch circuit also comprises an anti-electromagnetism interference unit (15), the anti-electromagnetism interference unit (15) is located between the rectifier unit (11) and the first temperature control unit (P).

8. The temperature control switch circuit according to claim 3, wherein the temperature control switch circuit also comprises an anti-electromagnetism interference unit (15), the anti-electromagnetism interference unit (15) is located between the rectifier unit (11) and the first temperature control unit (P).

9. The temperature control switch circuit according to claim 2, wherein the temperature control switch circuit also comprises a first peak voltage absorption unit (16) and a second peak voltage absorption unit (17), the first peak voltage absorption unit (16) is connected with the input side of the voltage conversion unit (13), and the second peak voltage absorption unit (17) is connected with the output side of the voltage conversion unit (13).

10. The temperature control switch circuit according to claim 3, wherein the temperature control switch circuit also comprises a first peak voltage absorption unit (16) and a second peak voltage absorption unit (17), the first peak voltage absorption unit (16) is connected with the input side of the voltage conversion unit (13), and the second peak voltage absorption unit (17) is connected with the output side of the voltage conversion unit (13).

11. The lamp power converter of claim 6, wherein the first temperature control unit (P) is a bimetal temperature switch, or a PTC (Positive Temperature Coefficient) element, or a temperature fuse, or other temperature protection devices.

12. The lamp power converter of claim 6, wherein the second temperature control unit (NTC) is a thermistor with a negative temperature coefficient, and the voltage conversion control unit (14) comprises a power control chip (U1) and a switch tube (Q1), the power control chip (U1) is electrically connected with the thermistor with a negative temperature coefficient, and the switch tube (Q1) is electrically connected with the voltage conversion unit (13).

13. The lamp power converter of claim 6, wherein the temperature control switch circuit also comprises an anti-electromagnetism interference unit (15), the anti-electromagnetism interference unit (15) is located between the rectifier unit (11) and the first temperature control unit (P).

14. The lamp power converter of claim 6, wherein the temperature control switch circuit also comprises a first peak voltage absorption unit (16) and a second peak voltage absorption unit (17), the first peak voltage absorption unit (16) is connected with the input side of the voltage conversion unit (13), and the second peak voltage absorption unit (17) is connected with the output side of the voltage conversion unit (13).

* * * * *